US005935658A

United States Patent [19]

Clerc

[11] Patent Number: 5,935,658

[45] Date of Patent: Aug. 10, 1999

[54] PROCESS FOR CONTINUOUS APPLICATION OF AN ORGANIC COATING ON A MOVING METALLURGICAL PRODUCT AND APPARATUS FOR ITS IMPLEMENTATION

[75] Inventor: Denis Clerc, Rosselange, France

[73] Assignee: Sollac, Puteaux, France

[21] Appl. No.: 08/969,654

[22] Filed: Nov. 13, 1997

[30] Foreign Application Priority Data

Nov. 13, 1996 [FR] France .................................. 96 13772

[51] Int. Cl.[6] ................................ B05D 1/28; B05C 1/00; B05C 3/00; B01D 19/00

[52] U.S. Cl. .......................... 427/428; 118/422; 118/600; 118/249; 427/434.2; 427/434.5; 427/435

[58] Field of Search ................................ 427/428, 434.2, 427/434.5, 435; 118/422, 249, 600; 96/204, 214, 217; 68/202, 207

[56] References Cited

U.S. PATENT DOCUMENTS

| | | | |
|---|---|---|---|
| 2,221,780 | 11/1940 | Conrad et al. . | |
| 3,951,102 | 4/1976 | Allen | 118/249 |
| 4,093,757 | 6/1978 | Barraud et al. | 427/434 A |
| 4,158,333 | 6/1979 | Navi | 101/363 |
| 4,349,587 | 9/1982 | Aloisio, Jr. et al. | 427/163 |
| 4,439,212 | 3/1984 | Wang | 55/27 |
| 5,298,141 | 3/1994 | Irie et al. | 204/299 |
| 5,587,017 | 12/1996 | Yamanaka et al. | 118/424 |

OTHER PUBLICATIONS

Patent Abstracts of Japan; vol. 013, No. 419 (C–637), Sep. 18, 1989 & JP 01 156494 A (Nippon Mining Co. Ltd.), Jun. 20, 1989.

*Primary Examiner*—Katherine A. Bareford
*Assistant Examiner*—Jennifer Calcagni
*Attorney, Agent, or Firm*—Oblon, Spivak, McClelland, Maier & Neustadt, P.C.

[57] ABSTRACT

The invention relates to a process for application of an organic coating on a moving metallurgical product 7 from a bath of a liquid organic material 3 contained in a vat 2 and liable to comprise air bubbles, the transfer of said liquid organic material 3 onto the product being accomplished in a coating zone, characterized in that, in order to eliminate said air bubbles, there is created in at least one zone of the bath, located upstream from said coating zone, an ascending current in the liquid material so as to convey the air bubbles from the bath to the vicinity of its surface and cause their bursting. The invention also relates to an apparatus for the implementation of this process.

8 Claims, 1 Drawing Sheet

PROCESS FOR CONTINUOUS APPLICATION OF AN ORGANIC COATING ON A MOVING METALLURGICAL PRODUCT AND APPARATUS FOR ITS IMPLEMENTATION

BACKGROUND OF THE INVENTION

Field of the Invention

The invention relates to a process and apparatus for the application of an organic coating on a moving metallurgical product, in particular the continuous coating of steel strips with a resin.

DISCUSSION OF THE BACKGROUND

Steel strips, after having been rolled, may then undergo various metallurgical treatments, such as a continuous annealing and an electrogalvanization, followed by a surface finishing treatment including application of an organic coating of resin.

The continuous application of a liquid organic material such as a resin or a paint usually is carried out by roller coating. The required installation comprises a vat continuously supplied with said liquid organic material by means of a supply ramp. A series of rollers in rotation, in which the lower portion of at least one of them is immersed in the vat, are arranged so that the liquid organic material is applied uniformly on the moving strip.

The vat is supplied continuously with liquid organic material by means of a supply ramp submerging in said liquid organic material. This supply generates air bubbles on the surface of the bath which are carried along with the liquid organic material onto the rollers in rotation, then ultimately transferred to the moving strip, thus degrading its surface appearance.

A known means of mitigating this drawback is to place a partition in the vat, serving as a barrier between the supply ramp and the rollers in rotation. The air bubbles stagnating on the surface of the bath thus are held back by the partition, a passage provided in the lower portion of the vat allowing the free circulation of the liquid organic material clear of air bubbles, and consequently the obtaining of strips having a good surface appearance.

Nonetheless this partition used as an anti-bubble barrier solves only a part of the problem posed by the transfer of the bubbles onto the moving strip. As a matter of fact, the roller or rollers the lower portion of which is/are immersed in the bath of liquid organic material generate through their rotation air bubbles on the surface of the bath, which are going to be transferred onto the moving strip by means of the other rollers.

In addition, the rollers positioned above the surface of the bath of liquid organic material also generate air bubbles on the surface of the bath at the time of falling onto the surface of the bath of the excess liquid organic material not adhering to said rollers.

OBJECTS OF THE INVENTION

One object of the invention is to provide a means for preventing the bubbles generated by the rollers in rotation and by the supply ramp in the prior art from being transferred with the liquid organic material onto the moving strip and degrading the surface appearance thereof.

SUMMARY OF THE INVENTION

Figure 1:
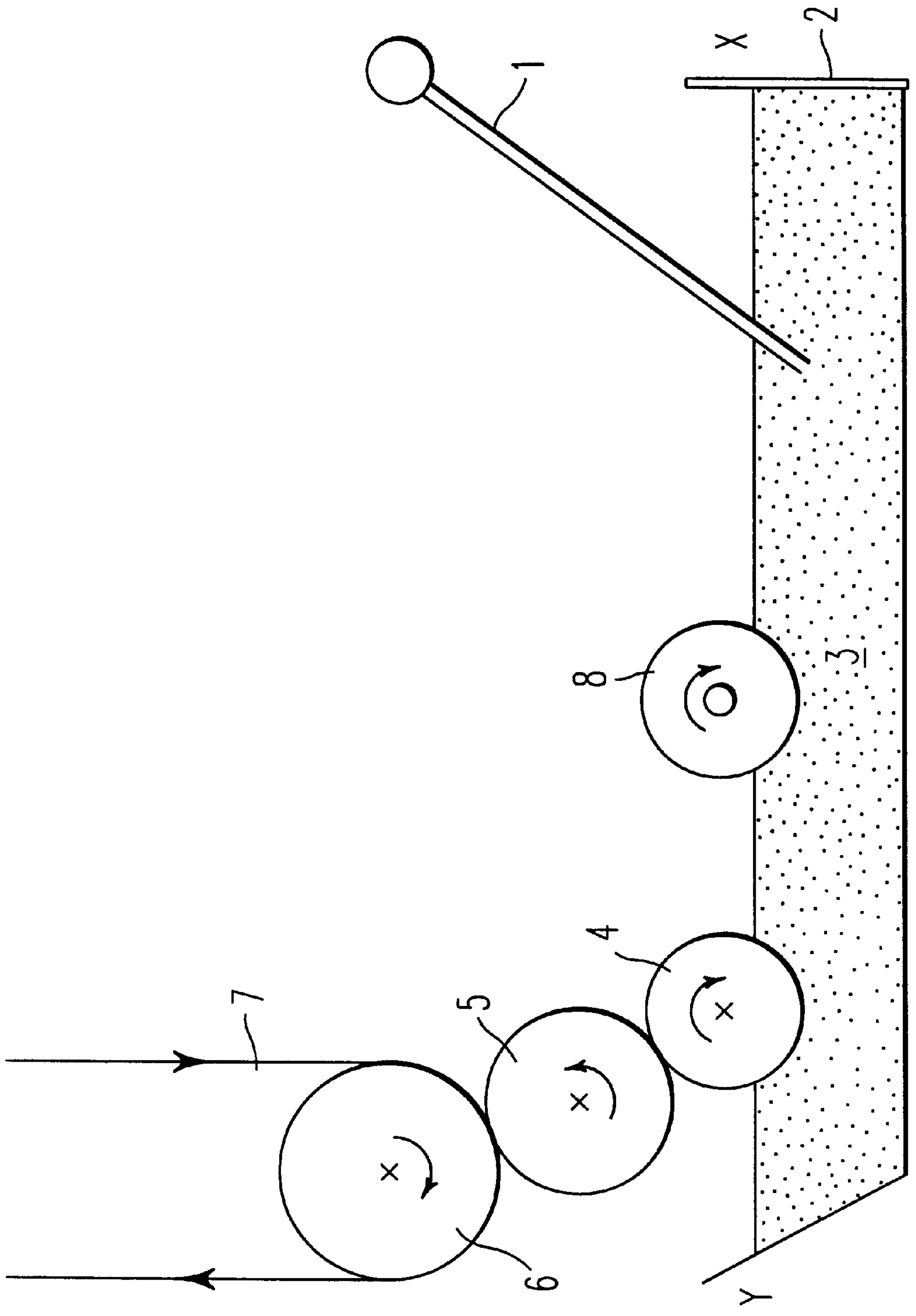
FIG. 1 shows an apparatus according to the invention.

To this end, the invention provides a process for continuous application of an organic coating on a moving metallurgical product from a bath of a liquid organic material contained in a vat and liable to comprise air bubbles, the transfer of said liquid organic material onto the product being accomplished in a coating zone, characterized in that in order to eliminate said air bubbles, there is created in at least one zone of the bath, located upstream from said coating zone, an ascending current in the liquid material so as to convey the bubbles contained in the bath to the vicinity of its surface and cause their bursting.

The invention also has as an object an apparatus for continuous application of an organic coating on a moving metallurgical product 7 for the implementation of the process described previously, said apparatus preferably comprising (with reference to FIG. 1):

- a vat 2 containing a liquid organic material 3,
- a ramp 1 submerging in the bath of organic material 3 and continuously supplying the vat 2 with liquid organic material 3,
- means for moving of the metallurgical product comprising a roller designated as holding roller 6,
- a roller designated as uptake roller 4, the lower portion of which is immersed in said vat 2 containing the liquid organic material 3, said uptake roller 4 transferring the organic material 3 onto a roller designated as applicator roller 5 which in turn transfers the organic material 3 onto the moving metallurgical product 7,
- characterized in that it comprises means for creating an ascending current in at least one zone of the vat positioned between the supply ramp 1 and the uptake roller 4, to hold back the air bubbles generated by the supply ramp 1 and to attract the air bubbles generated by the uptake roller 4 and by the falling into the vat of the organic material not adhering to the points of contact of the applicator roller 5 and the uptake roller 4.

The invention will be better understood upon reading of the following description, presented with reference to the sole FIGURE attached, which depicts schematically, seen in longitudinal section, an example of an anti-bubble apparatus in a coating installation according to the invention.

A supply ramp 1 submerging in a vat 2 of liquid organic material 3, said organic material being a resin in the liquid state, supplies said vat continuously with this liquid organic material. The flow of the supply ramp 1 preferably ranges between 50 and 60 l/mn adjusted to the type of resin used. This supplying of liquid organic material 3 into the vat 2 generates air bubbles on the surface of the bath.

A roller designated as uptake roller 4, the lower end of which is immersed in the vat 2 containing the liquid organic material 3, transfers said liquid organic material onto a roller designated as applicator roller 5, which in turns transfers the liquid organic material onto the moving metallurgical product 7 held by a holding roller 6. The speed of movement of the metallurgical product 7 preferably ranges, for example, between 60 and 80 m/mn.

The rotation of the uptake roller 4 generates the formation of air bubbles when said roller strikes against the surface of the bath. A portion of these air bubbles may be carried along with the rotation of said uptake roller 4 and transferred with the liquid organic material 3 onto the applicator roller 5, then ultimately onto the metallurgical product 7.

The excess of organic material not adhering to the points of contact of the uptake roller 4 and the applicator roller 5 results in the falling of drops of said liquid organic material into the bath, causing the formation of air bubbles on the surface of the bath of liquid organic material 3.

According to the invention, means such as a roller designated as mobile roller 8 for creating an ascending current to hold back bubbles from roller 4 is placed between the supply ramp 1 and the uptake roller 4. It is preferably immersed in its lower portion in the bath of liquid organic material 3 at approximately 2 cm from the surface and placed in rotation in a direction opposite to that of the uptake roller 4 in order to create in the liquid bath 3 ahead of the coating zone an ascending current so as to convey the air bubbles contained in the bath to the vicinity of the surface. Ideally, the speed of rotation of the mobile roller 8 is low, so that the rotation movement in the bath does not generate any new air bubbles.

The mobile roller 8 affords another advantage which is that of carrying along the air bubbles adhering to its surface, which no longer being in contact with the liquid organic material 3, end by bursting.

The bath of liquid organic material in the vicinity of the uptake roller 4 is free of air bubbles and thus makes it possible to obtain a strip coated with organic material having an excellent surface appearance.

An example of embodiment of this invention uses a vat 2 depicted schematically in section in FIG. 1, having vertical sides, that is, a straight upstream side x and a sloping downstream side y. The length of the vat 2 is 2.30 m, its width is 95 cm in the upper portion and 75 cm in the lower portion, and its depth 13 cm. The downstream side y is sloping, so as to limit the agitation in the bath of liquid organic material 3. The supply ramp 1 positioned in the vicinity of the vertical side x of the vat 2 comprises a horizontal pipe with a length of 1.55 m and a diameter of 3 to 4 cm to which are connected four oblique or vertical pipes 16 cm long and 3 to 4 cm in diameter, spaced 40 cm apart, the ends of which, 3 to 4 mm in diameter, submerge in the bath of liquid organic material 3.

The mobile roller 8 consisting of a steel core coated with a layer of rubber 3 to 4 cm thick, 25 cm in diameter and 2 m long, is immersed in the bath of liquid organic material 3 in its lower portion to a depth of 2 cm. The separation between the uptake roller 4, consisting of a chrome-coated steel core 25 cm in diameter and approximately 2 m long, and the mobile roller 8 is 5 cm.

The applicator roller 5, consisting of a steel core coated with a layer of rubber 30 cm in diameter and about 2 m long, is usable up to a certain level of wear of the rubber, that is, when the diameter of said roller reaches 25.5 cm.

The speed of movement of the metallurgical product 7 is 60 to 80 m/mn. If 100 is taken as the base for this speed, the speed of the applicator roller 5 varies from 130 to 160% of the speed of movement, the speed of the uptake roller 4 varies from 40 to 60% of the speed of movement and the speed of the mobile roller 8 is from 5 to 15% (typically 10%) of the speed of movement.

The liquid organic materials 3 applied on the metal strips 7 with the aid of such an installation are, for example, very fluid resins the dynamic viscosity of which is approximately 10 cP. By way of example of a resin used, one may use SOLPLEX, a silica-based resin currently used in the automobile industry and the coating thickness of which is on the order of 7 $\mu$m in moist layer.

The flow of the supply-ramp pump varies between 50 to 60 l/mn according to the viscosity of the resin.

The invention, of course, is not limited to the example which has been described and depicted; the mobile roller 8 can be replaced by any other means comprising a mobile surface the movement of which creates an ascending current within the bath of organic material.

French patent application 96 13 772 filed Nov. 13, 1996, is incorporated herein by reference.

What is claimed as new and is desired to be secured by Letters Patent of the United States is:

1. Process for application of an organic coating on a moving metallurgical product from a bath of liquid organic material contained in a vat, the transfer of said liquid organic material onto the product being accomplished in a coating zone, wherein in order to eliminate air bubbles an ascending current is generated in the liquid organic material bath between the coating zone and an element which generates the ascending current so as to convey air bubbles in the bath to the vicinity of the bath surface and cause their bursting.

2. Process according to claim 1, wherein said air bubbles are carried along by an ascending current generated by the movement of an element on the surface to which said bubbles come to adhere.

3. Process according to claim 1, wherein the element which generates the ascending current is a rotating mobile roller.

4. Apparatus for application of an organic coating on a moving metallurgical product comprising:

a vat for containing a liquid organic material, a supply ramp, comprising a horizontal pipe connected to oblique or vertical pipes the ends of which are submerged in said vat for supplying the vat with said liquid organic material, means for moving the metallurgical product comprising a holding roller, an uptake roller, the lower portion of which is positioned in said vat, said uptake roller positioned for transferring the organic material onto an applicator roller which is positioned to transfer the organic material onto the moving metallurgical product, said apparatus further comprising means for creating an ascending current in the bath ahead of the coating zone, between the uptake roller and an element which generates the ascending current, in order to hold back air bubbles generated by the supply ramp and to attract the air bubbles generated by the uptake roller and by the falling into the vat of the organic material not adhering to the contact points of the applicator roller and the uptake roller.

5. Apparatus according to claim 4, wherein said means for creating an ascending current consist of an element comprising a mobile surface positioned so as to be partially immersed in said liquid organic material in said vat.

6. Apparatus according to claim 5, wherein said element consists of a rotating mobile roller.

7. Apparatus according to claim 5, wherein the mobile surface moves in the same direction as the uptake roller.

8. Apparatus according to claim 5, wherein the speed of movement of the mobile surface is from 5 to 15% of the speed of movement of the metallurgical product.

* * * * *